(12) United States Patent
Helm

(10) Patent No.: US 10,576,942 B1
(45) Date of Patent: Mar. 3, 2020

(54) TURNTABLE FOR CARS

(71) Applicant: Glenn Jonathan Helm, Yakima, WA (US)

(72) Inventor: Glenn Jonathan Helm, Yakima, WA (US)

(*) Notice: Subject to any disclaimer, the term of this patent is extended or adjusted under 35 U.S.C. 154(b) by 0 days.

(21) Appl. No.: 16/114,835

(22) Filed: Aug. 28, 2018

(51) Int. Cl.
*B60S 13/02* (2006.01)

(52) U.S. Cl.
CPC ....................... *B60S 13/02* (2013.01)

(58) Field of Classification Search
CPC ........................................................ B60S 13/02
USPC ................................ 104/35, 44, 46
See application file for complete search history.

(56) References Cited

U.S. PATENT DOCUMENTS

| | | | | |
|---|---|---|---|---|
| 1,408,747 A * | 3/1922 | Krug | ........................ | B60S 13/02 104/44 |
| 1,562,853 A * | 11/1925 | Schonberger | ............ | B60S 13/02 104/45 |
| 1,977,864 A * | 10/1934 | Smith | ...................... | B60S 13/02 104/44 |
| 2,025,320 A * | 12/1935 | Waalkes | .................. | A47F 5/025 104/44 |
| 4,498,398 A * | 2/1985 | Vallee | ...................... | A47F 5/025 104/44 |
| 4,519,493 A * | 5/1985 | Dyer | ..................... | B65G 47/244 104/35 |
| 4,753,173 A * | 6/1988 | James | ...................... | B60S 13/02 104/35 |
| 5,086,704 A * | 2/1992 | Mueller | ..................... | E04H 6/40 104/36 |
| 5,755,160 A * | 5/1998 | Blufordcraving | ....... | B60S 13/02 104/36 |
| 6,467,746 B1 * | 10/2002 | Paskiewicz | ............. | B60S 13/02 104/44 |
| 6,672,221 B2 * | 1/2004 | Hadley | ...................... | B64F 1/24 104/35 |
| 6,817,300 B2 * | 11/2004 | Schwenker | ................ | B61J 1/02 104/44 |
| 6,877,437 B2 * | 4/2005 | Murdock | ................ | B60S 13/02 104/35 |
| 6,877,438 B2 * | 4/2005 | Olbort | ..................... | B60S 13/02 104/35 |
| 7,631,602 B2 * | 12/2009 | Schwenker | ............. | B60S 13/02 104/35 |
| 7,798,067 B2 * | 9/2010 | Starnes | ..................... | E04H 6/40 104/35 |

(Continued)

*Primary Examiner* — Zachary L Kuhfuss
(74) *Attorney, Agent, or Firm* — Michael D. Eisenberg

(57) ABSTRACT

A motorized turntable assembly configured for rotation of vehicles, which may be assembled on site and installed in a driveway or garage. The turntable assembly includes an annular platform that is assembled from a number of wedge-shaped sections and has an outer disk partition, an inner disk partition, and a central opening defining a cylindrical axle therebetween; wherein the annular platform is mounted on the cylindrical axle for rotational support and elevation above a foundation. There is an inner rail and outer rail, and a plurality of weight bearing and non-weight bearing wheels disposed around the central opening. A motor assembly consisting of a motor connected by a single, continuous belt is wrapped around the outer circumference of annular platform, and a spring tensioned pivot mechanism keeps the belt in contact with the annular platform.

11 Claims, 5 Drawing Sheets

(56) References Cited

U.S. PATENT DOCUMENTS

| | | | | |
|---|---|---|---|---|
| 7,966,939 | B2* | 6/2011 | Holt | B60S 13/02 104/35 |
| 8,424,458 | B2* | 4/2013 | Holt | B60S 13/02 104/36 |
| 8,424,459 | B2* | 4/2013 | Holt | B60S 13/02 104/36 |
| 9,073,558 | B2* | 7/2015 | Knapp | B61J 1/04 |
| 9,295,324 | B2* | 3/2016 | Knapp | B61J 1/04 |
| 9,446,744 | B2* | 9/2016 | Amendolea | B60S 13/02 |
| 2017/0282868 | A1* | 10/2017 | Mondro | B60S 13/02 |
| 2018/0201237 | A1* | 7/2018 | Wells | B60S 13/02 |

* cited by examiner

1/2" Steel Pattern

TURNTABLE FOR CARS

FIELD OF TECHNOLOGY

The present invention relates to a motorized turntable assembly configured for rotation of vehicles, which may be assembled on site and installed in a driveway or garage.

BACKGROUND

Many homes have narrow driveways with no room for cars to turn around, forcing drivers to back out onto busy roadways. In such instances, it is useful to be able to change the direction of a vehicle when there is not adequate room to turn the vehicle as it is being operated. Car turntables have been developed to rotate vehicles to a forward position, thereby minimizing the likelihood of back-over and reversing accidents. Disadvantages of prior art turntables are that they are extremely heavy, require on-site construction and assembly, and are very expensive. Accordingly, there is a need for a relatively inexpensive, easily self-assembled vehicle turntable which may be readily operated to reposition a vehicle in a garage or driveway.

BRIEF SUMMARY OF THE INVENTION

The invention may be referred to herein as a motorized turntable assembly for rotation of vehicles, which may be assembled on site and installed in a driveway or garage.

In a variant, a method of building by assembly, a turntable, wherein the turntable comprises an annular platform having an inner and an outer partition of wedge-shaped sections. The method entails the following steps: constructing an adequate foundation to support the weight of the annular platform and the loads to be applied thereon; attaching an annular platform from a plurality of wedge shaped sections, wherein each wedge shaped section is joined to a neighboring wedge shaped section so as to form an inner partition and an outer partition of a disk; forming a central opening in the annular platform defining a cylindrical axle therebetween around which the annular platform is mounted for rotational support and elevation above the solid foundation; attaching an inner rail and an outer rail that line an inner and outer circumferences of the annular platform; attaching a plurality of wheels to a bottom of the annular platform around the inner and outer circumferences; attaching a motor assembly off-center from the platform and connecting it to the platform via a drive belt made from elastomeric material and wrapping it around the platform; wherein force is transmitted from the motor to the annular platform so that it permits rotation of the turntable on the foundation.

In another variant, the solid foundation is made of concrete that is poured into a recessed cylindrical pit that is below ground level.

In a further variant, the wedge shaped sections that comprise the annular platform are joined by brackets welded to neighboring wedge shaped sections; and wherein threaded fastener elements are welded to the brackets.

In still another variant, the annular platform has a central opening defining a cylindrical axle therebetween; wherein the cylindrical axle is interposed longitudinally between the annular platform and the solid foundation.

In yet a further variant, the annular platform is rotated about its center by a cylindrical axle that is fastened to a bearing.

In a variant, the motor assembly located adjacent to the turntable has a motor, an idler-wheel drive, the belt, a spring, and a radio receiver; where the idler-wheel drive transmits the rotation of the motor to the annular platform; wherein the belt is a single, continuous belt and is fastened to the motor assembly and wraps around the outer circumference of the annular platform; wherein the spring on the motor assembly applies tension to the belt; and wherein the radio receiver remotely controls the motor assembly and allows for rotation of the annular platform.

In another variant, a jack system is attached to the annular platform, which is comprised of a jack screw and jack nut, to the bottom of the annular platform on the rigid wedge shaped sections to help lift the plate to be able to place the belt.

In a further variant, a plurality of wheels are attached to the bottom surface of the annular platform around the central opening, which allow for rotation of the platform about the cylindrical axle; and attaching a number of weight-bearing wheels to the bottom surface of the annular platform around the inner and outer circumferences of the outer disk partition.

In still another variant, a cylindrical axle is mounted vertically between the annular platform and solid foundation. The base of the cylindrical axle is disposed within a flanged sleeve that is mounted on the solid foundation. Bearings are fastened around the cylindrical axle at the openings of the flanged sleeve.

In yet a further variant, a turntable assembly for rotating vehicles, comprises an annular platform formed from a number of wedge-shaped sections and having an outer disk partition, an inner disk partition, and a central opening defining a cylindrical axle therebetween; wherein the annular platform is mounted on the cylindrical axle for rotational support and elevation above a foundation; an inner rail and outer rail, and a plurality of wheels disposed adjacent to the inner and outer rails and around the central opening; a motor assembly consisting of a motor connected by a single, continuous belt to the outer circumference of annular platform, and a spring tensioned pivot mechanism to keep the belt in contact with the outer circumference of the annular platform.

In a variant, a remote control mechanism is used to actuate the motor and turn the annular platform.

In another variant, a turntable for accommodating a vehicle thereon comprises a cylindrical axle having bearing means for allowing rotation of the platform relative to the foundation.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
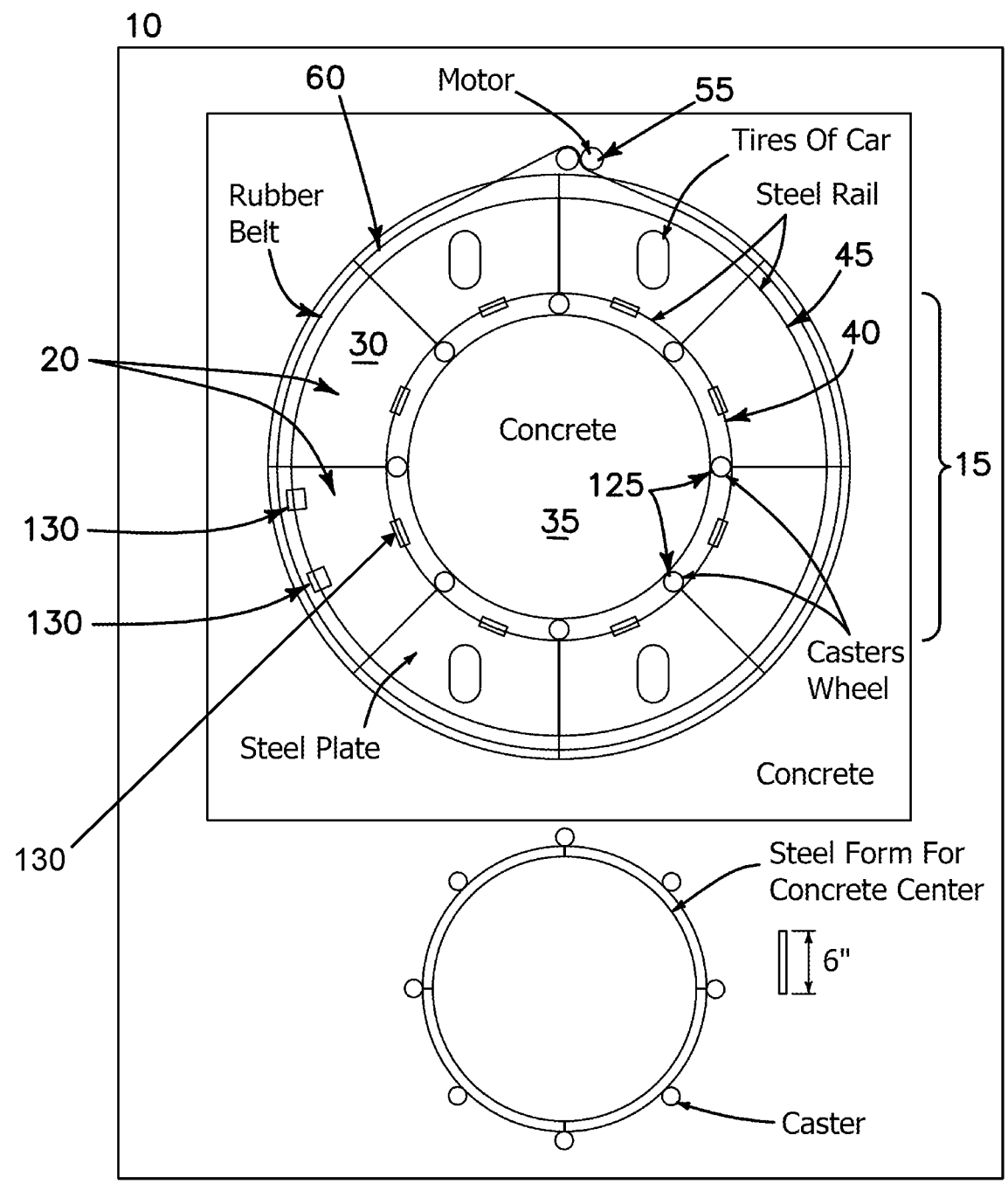
FIG. 1 illustrates a top view of a first embodiment of the assembly of the invention with the inner circumference of wedges removed to show the various features of the invention as it would be installed.
Figure 2:
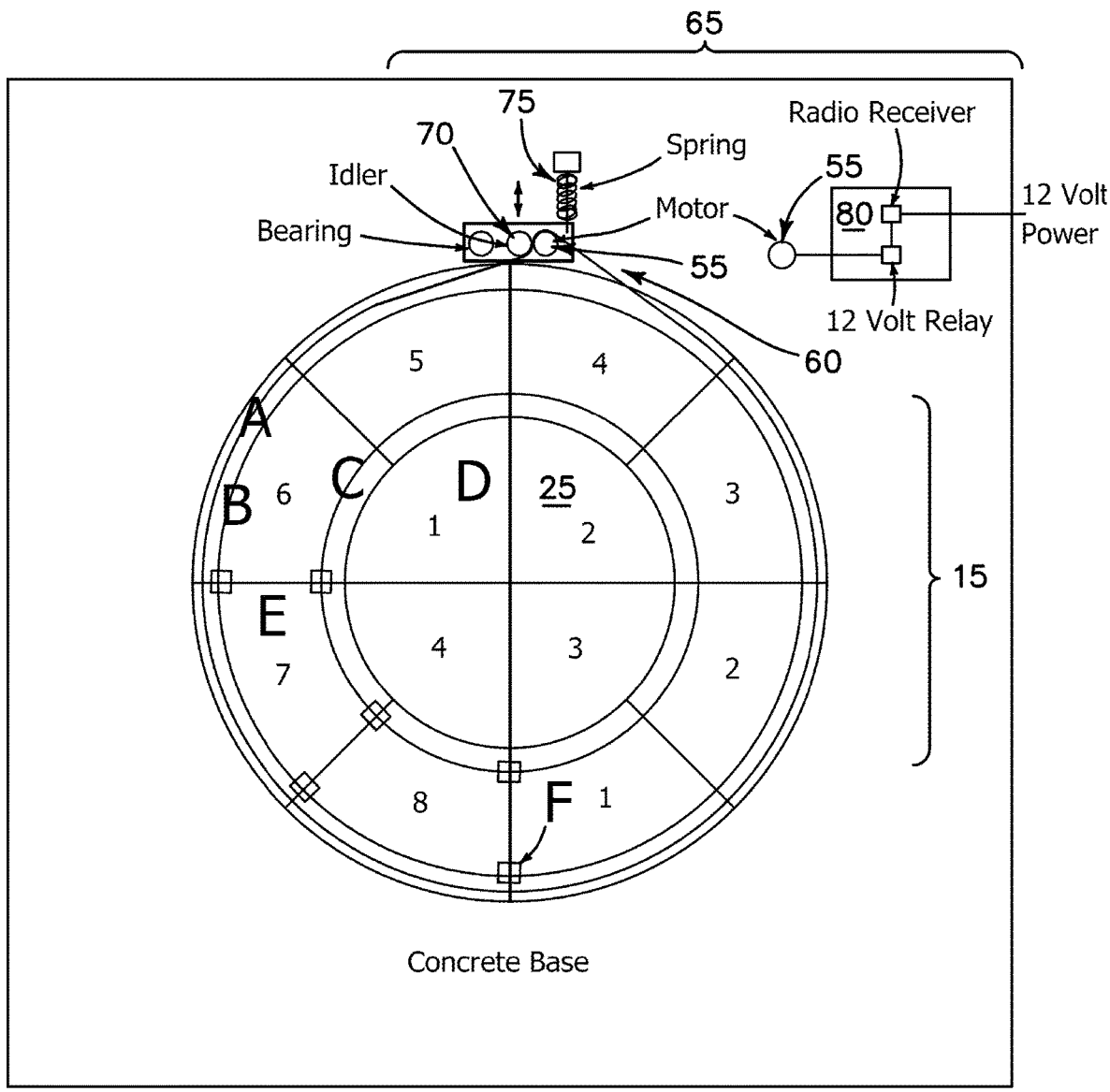
FIG. 2 illustrates a top view of a first embodiment of the assembly of the invention.

Throughout this document, the following reference numbers are used:

10 Turntable assembly
15 Annular platform
20 Rigid wedge shaped sections
25 Inner partition
30 Outer partition
35 Solid foundation
40 Inner guide rail
45 Outer guide rail
50 Bottom side of the annular platform
55 Motor
60 Drive belt
65 Motor assembly
70 Idler-wheel
75 Spring
80 Radio receiver
85 Brackets
90 Threaded fastener elements
95 Central opening
100 Cylindrical axle
105 Bearing
110 Jack system
115 Jack screw
120 Jack nut
125 Non-weight bearing wheels
130 Weight bearing wheels
135 Flanged sleeve As first illustrated in FIG. 1, a turntable assembly 10 has an annular platform 15 having a plurality of rigid wedge shaped sections 20. Referring to FIG. 2, each wedge shaped section 20 is joined to a neighboring wedge shaped section 20 so as to form an inner partition 25 and outer partition 30 of a disk. Referring to FIG. 1, the inner partition 25 of wedge shaped sections has been removed to expose a solid foundation 35. The annular platform 15 is supported on a solid foundation 35 by inner 40 and outer 45 guide rails that line the inner and outer circumferences of the outer partition 30. The solid foundation 35 may be made of concrete that is poured to a depth below ground level. On the bottom side 50 of the annular platform 15 are a plurality of wheels 125, 130 disposed around the perimeter of the inner rail 40. A motor 55 is located off-center from the annular platform 15, either underneath it or entirely outside of it, and is connected to the platform 15 by a drive belt 60 made from elastomeric material. The elastomeric material, which may be a V-belt, wraps around the platform 15. Force is transmitted from the motor 55 to the annular platform 15 so that it rotates continuously.

As shown in FIG. 2, a motor assembly 65 located adjacent to the turntable has a motor 55, an idler-wheel 70, a belt 60, a spring 75, and a radio receiver 80. The idler-wheel 70 transmits the rotation of the motor 55 to the annular platform 15. A single, continuous belt 60 is fastened to the motor assembly 65 and wraps around the outer circumference of the annular platform 15. The spring 75 on the motor assembly 65 applies tension to the belt 60. The radio receiver 80 remotely controls the motor assembly 65 and allows for rotation of the annular platform 15.

Figure 3:
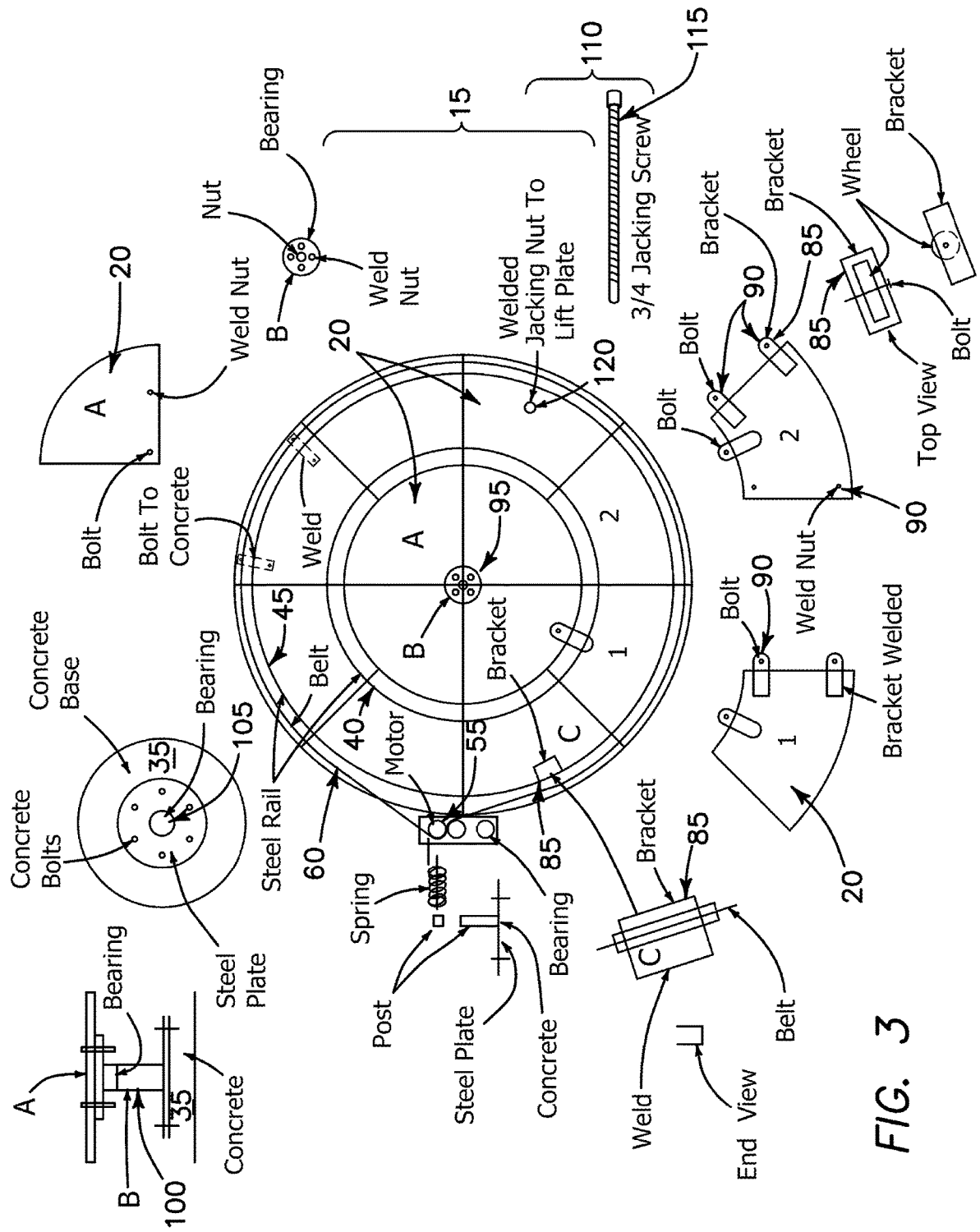
FIG. 3 illustrates a top view of a first embodiment of the assembly of the invention.

As indicated in FIG. 3, the wedge shaped sections 20 that comprise the annular platform 15 are joined by brackets 85 welded to neighboring wedge shaped sections 20. Threaded fastener elements 90 are welded to the brackets 85. The threaded fastener elements 90 may be weld nuts and concrete bolts. Additional threaded fastener elements 90 secure the rails 40, 45 on the annular platform 15 to the solid foundation 35. The annular platform 15 has a central opening 95 defining a cylindrical axle 100 therebetween. The cylindrical axle 100 is interposed between the annular platform 15 and the solid foundation 35. In one embodiment of the invention the annular platform 15 is rotated about its center by a cylindrical axle 100 that is fastened to a bearing 105. The bearing 105 may be a tapered roller bearing, which is designed to simultaneously support axial and radial loads. A jack system 110 is attached to the bottom of the annular platform 15 for lifting the plate to be able to place the belt. The plate is lifted by the jack system to expose the bracket that holds the belt (for example, by lifting the plate by approximately 6 inches above the concrete rim). The jack system 110 may be comprised of a jack screw 115 and jack nut 120.

Figure 4:
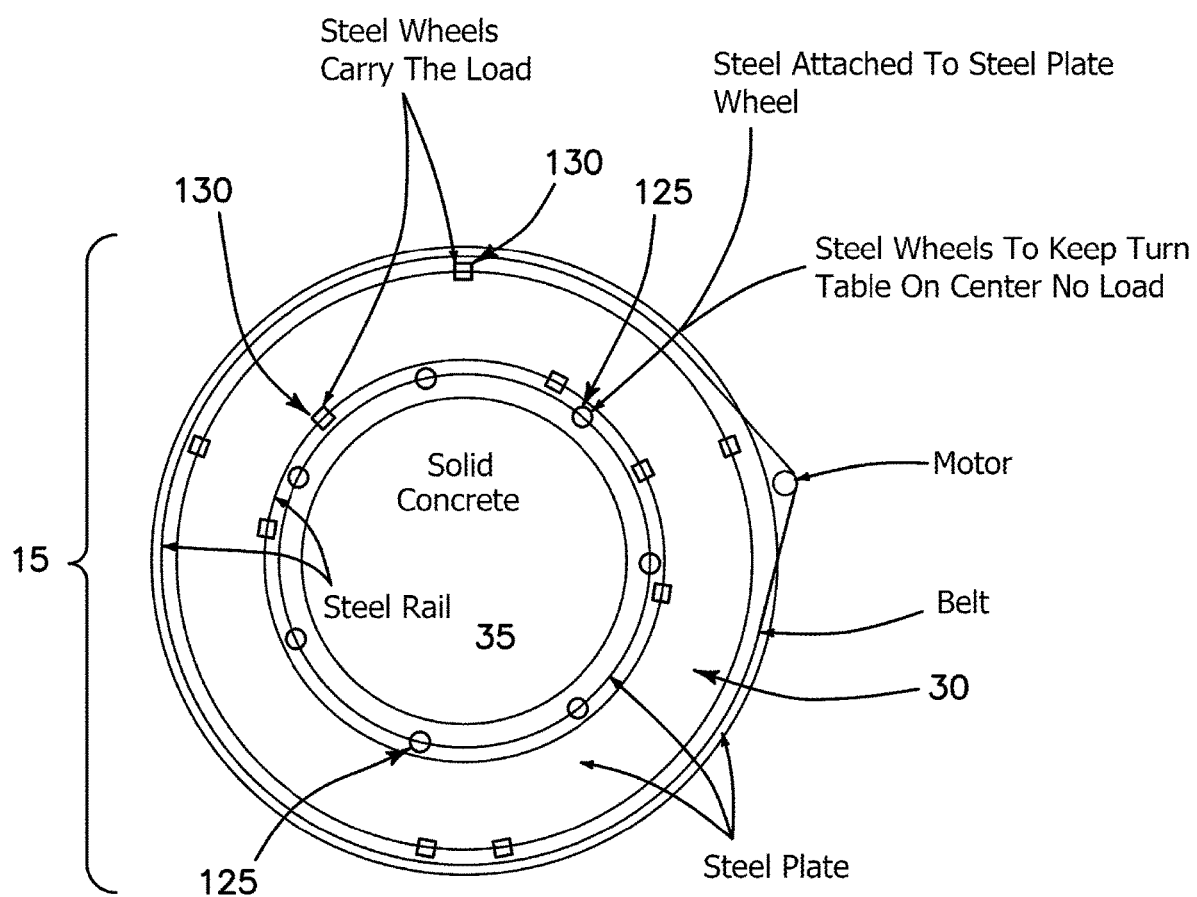
FIG. 4 illustrates a top view of a second embodiment of the assembly of the invention with the inner circumference of wedges removed to show the various features of the invention as it would be installed.
Figure 5:
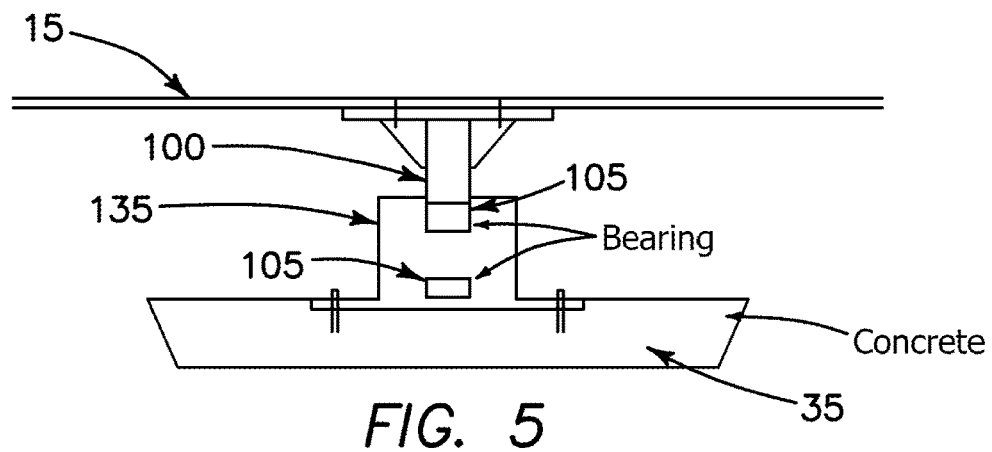
FIG. 5 illustrates a side view of a first embodiment of the assembly of the invention.

In the embodiment illustrated in FIG. 4, a plurality of wheels 125, 130 are attached to the bottom surface of the annular platform 15. The wheels 125, 130 may be soft-tired industrial casters. Referring to FIGS. 4-6, a plurality of non-weight bearing wheels 125 surround the central opening 95 and allow rotation of the platform 15 about the cylindrical axle 100. A number of weight bearing wheels 130 line the inner and outer circumferences of the outer disk partition 30.

In another variant, referring to FIG. 5, a cylindrical axle 100 is mounted vertically between the annular platform 15 and solid foundation 35. The base of the cylindrical axle 100 is disposed within a flanged sleeve 135 that is mounted on the solid foundation 35. Bearings 105 are fastened around the cylindrical axle 100 at the openings of the flanged sleeve 135.

Figure 6A:
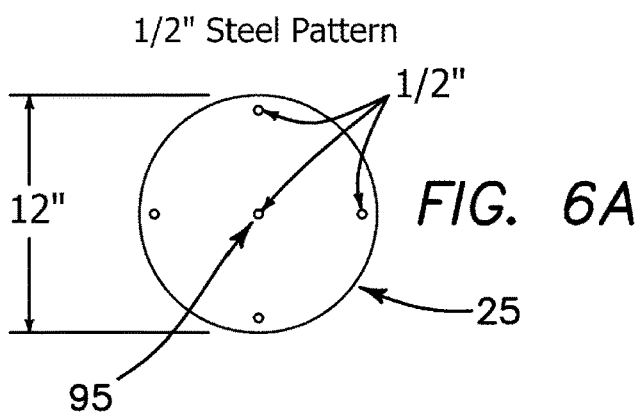
FIG. 6A-6C illustrate top views of a stationary core with a central opening according to different embodiments.
Figure 6B:
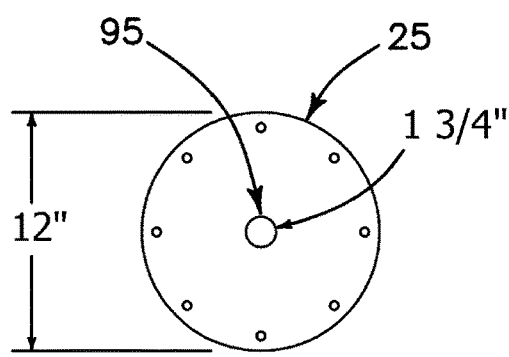
Figure 6C:
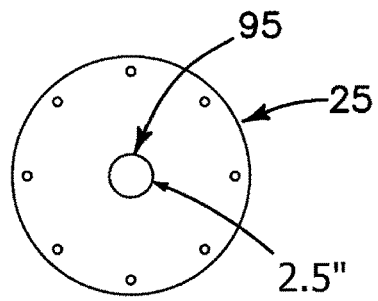

As illustrated in FIGS. 6A-6C, the central opening 95 in the inner disk partition 25 may be different sizes. In a variant, referring to FIG. 6A, there is a 1/2-inch central opening 95 in the inner disk partition 25. In another variant, referring to FIG. 6B, there is a central opening 95 of 1¾-inches in the inner disk partition 25. In a further variant, referring to FIG. 6C, there is a central opening 95 of 2½-inches in the inner disk partition 25.

Figure 7A:
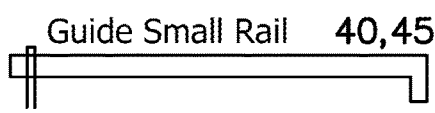
FIG. 7A-7B illustrate side views of a guide rail according to different embodiments.
Figure 7B:
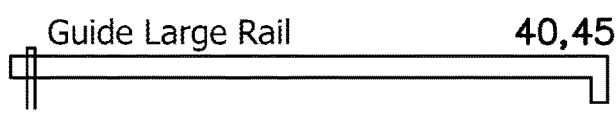

As illustrated in FIGS. 7A-7B, guide rails may be different lengths 40, 45. In a variant, referring to FIG. 7A, the guide rails 40, 45 may be small. In another variant, referring to FIG. 7B, the guide rails 40, 45 may be large.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A method of building by assembly, a turntable, the turntable comprising an annular platform having an inner and an outer partition of wedge-shaped sections, said method comprising the steps of:
   constructing an adequate foundation to support the weight of the annular platform and the loads to be applied thereon;
   attaching an annular platform from a plurality of wedge shaped sections, wherein each wedge shaped section is joined to a neighboring wedge shaped section so as to form an inner partition and an outer partition of a disk;
   forming a central opening in the annular platform defining a cylindrical axle therebetween around which the annular platform is mounted for rotational support and elevation above the solid foundation;
   attaching an inner rail and an outer rail that line an inner and outer circumferences of the annular platform;
   attaching a plurality of wheels to a bottom of the annular platform around the inner and outer circumferences;
   attaching a motor assembly off-center from the platform and connecting the motor assembly to the platform via a drive belt made from elastomeric material and wrapping the drive belt around the platform;
   wherein force is transmitted from the motor to the annular platform so that the motor permits rotation of the turntable on the foundation;
   attaching a jack system, which is comprised of a jack screw and jack nut, to the bottom of the annular platform on the rigid wedge shaped sections in order to lift the plate to be able to place the belt.

2. The method of claim 1, wherein the solid foundation is made of concrete that is poured into a recessed cylindrical pit that is below ground level.

3. The method of claim 1, wherein the wedge shaped sections that comprise the annular platform are joined by brackets welded to neighboring wedge shaped sections; and wherein threaded fastener elements are welded to the brackets.

4. The method of claim 1, wherein the annular platform has a central opening defining a cylindrical axle therebetween; wherein the cylindrical axle is interposed longitudinally between the annular platform and the solid foundation.

5. The method of claim 4, wherein the annular platform is rotated about its center by a cylindrical axle that is fastened to a bearing.

6. The method of claim 1, further comprising:
   a cylindrical axle mounted vertically between the annular platform and solid foundation; wherein the base of the cylindrical axle is disposed within a flanged sleeve that is mounted on the solid foundation wherein bearings are fastened around the cylindrical axle at the openings of the flanged sleeve.

7. A method of building by assembly, a turntable, the turntable comprising an annular platform having an inner and an outer partition of wedge-shaped sections, said method comprising the steps of:
   constructing an adequate foundation to support the weight of the annular platform and the loads to be applied thereon;
   attaching an annular platform from a plurality of wedge shaped sections, wherein each wedge shaped section is joined to a neighboring wedge shaped section so as to form an inner partition and an outer partition of a disk;
   forming a central opening in the annular platform defining a cylindrical axle therebetween around which the annular platform is mounted for rotational support and elevation above the solid foundation;
   attaching an inner rail and an outer rail that line an inner and outer circumferences of the annular platform;
   attaching a plurality of wheels to a bottom of the annular platform around the inner and outer circumferences;
   attaching a motor assembly off-center from the platform and connecting the motor assembly to the platform via a drive belt made from elastomeric material and wrapping the drive belt around the platform;
   wherein force is transmitted from the motor to the annular platform so that the motor permits rotation of the turntable on the foundation;
   wherein the motor assembly located adjacent to the turntable has a motor, an idler-wheel drive, the belt, a spring, and a radio receiver; where the idler-wheel drive transmits the rotation of the motor to the annular platform; wherein the belt is a single, continuous belt and is fastened to the motor assembly and wraps around the outer circumference of the annular platform; wherein the spring on the motor assembly applies tension to the belt; and wherein the radio receiver remotely controls the motor assembly and allows for rotation of the annular platform.

8. The method of claim 7 further comprising:
   attaching a plurality of wheels to the bottom surface of the annular platform around the central opening, which allow for rotation of the platform about the cylindrical axle; and attaching a number of weight-bearing wheels to the bottom surface of the annular platform around the inner and outer circumferences of the outer disk partition.

9. A turntable assembly for rotating vehicles, comprising:
an annular platform formed from a number of wedge-shaped sections and having an outer disk partition, an inner disk partition, and a central opening defining a cylindrical axle therebetween; wherein
the annular platform is mounted on the cylindrical axle for rotational support and elevation above a foundation;
an inner rail and outer rail, and a plurality of wheels disposed adjacent to the inner and outer rails and around the central opening;
a motor assembly consisting of a motor connected by a single, continuous belt to the outer circumference of annular platform, and a spring tensioned pivot mechanism to keep the belt in contact with the outer circumference of the annular platform.

10. The assembly of claim 9 further comprising a remote control mechanism used to actuate the motor and turn the annular platform.

11. The assembly of claim 9 wherein a turntable for accommodating a vehicle thereon, comprises a cylindrical axle having bearing means for allowing rotation of the platform relative to the foundation.

\* \* \* \* \*